United States Patent [19]

Patt et al.

[11] Patent Number: 5,017,819

[45] Date of Patent: May 21, 1991

[54] LINEAR MAGNETIC SPRING AND SPRING/MOTOR COMBINATION

[75] Inventors: Paul J. Patt, Mt. Kisco; Fred R. Stolfi, Shrub Oak, both of N.Y.

[73] Assignee: North American Philips Corporation, New York, N.Y.

[21] Appl. No.: 531,699

[22] Filed: Jun. 12, 1989

Related U.S. Application Data

[63] Continuation of Ser. No. 928,611, Nov. 4, 1986, which is a continuation of Ser. No. 651,391, Sep. 14, 1984, abandoned.

[51] Int. Cl.$^5$ .............................................. H02K 7/09
[52] U.S. Cl. ...................................... 310/90.5; 310/12
[58] Field of Search .................... 310/90.5, 12, 13, 14, 310/15, 30

[56] References Cited

U.S. PATENT DOCUMENTS

| | | | |
|---|---|---|---|
| 3,614,181 | 10/1971 | Meeks | 310/90.5 |
| 4,072,370 | 2/1978 | Wasson | 310/90.5 |
| 4,379,598 | 4/1983 | Goldowsky | 340/90.5 |
| 4,439,700 | 3/1984 | Menzel et al. | 310/27 X |
| 4,473,259 | 9/1984 | Goldowsky | 310/90.5 |

FOREIGN PATENT DOCUMENTS

| | | |
|---|---|---|
| 0060969 | 9/1982 | European Pat. Off. ..... 310/90.5 UX |
| 1051589 | 2/1959 | Fed. Rep. of Germany . |
| 2013051 | 3/1970 | Fed. Rep. of Germany . |
| 1614727 | 6/1972 | Fed. Rep. of Germany . |
| 2229332 | 1/1973 | Fed. Rep. of Germany ..... 310/90.5 UX |
| 2709074 | 3/1977 | Fed. Rep. of Germany . |
| 0691477 | 10/1930 | France .................. 310/90.5 UX |
| 2087617 | 12/1971 | France . |

OTHER PUBLICATIONS

"Magnetic and Electric Suspensions"; Geary; British Scientific Instrument Research Assoc.; 1964.
"Permanent Magnet Bearings and Couplings"; T. P. Yonnet; IEEE Transactions on Magnetics; vol. MAG-17, No. 1, 1/1981; pp. 1169-1173.
"Directivity and Stability of Coaxial Permanent Magnet Systems"; Gast et al; Fifth Int. Workshop on Rare Earth-Cobolt P.M's & Their Applications; 6/1881; publ. by Univ. of Dayton, KK365.

*Primary Examiner*—R. Skudy
*Attorney, Agent, or Firm*—David R. Treacy

[57] ABSTRACT

A magnetic spring, or a spring and motor combination, providing a linear spring force characteristic in each direction from a neutral position, in which the spring action may occur for any desired coordinate of a typical orthogonal coordinate system. A set of magnets are disposed, preferably symmetrically about a coordinate axis, poled orthogonally to the desired force direction. A second set of magnets, respectively poled opposite the first set, are arranged on the sprung article. The magnets of one of the sets are spaced a greater distance apart than those of the other, such that an end magnet from each set forms a pair having preferably planar faces parallel to the direction of spring force, the faces being offset so that in a neutral position the outer edge of the closer spaced magnet set is aligned with the inner edge of the greater spaced magnet set. For use as a motor, a coil can be arranged with conductors orthogonal to both the magnet pole directions and the direction of desired spring force, located across from the magnets of one set and fixed with respect to the magnets of the other set. In a cylindrical coordinate system having axial spring force, the magnets are radially poled and motor coils are concentric with the cylinder axis.

19 Claims, 2 Drawing Sheets

LINEAR MAGNETIC SPRING AND SPRING/MOTOR COMBINATION

The invention described herein was made in the performance of work under NASA Contract No. NAS5-26688 and is subject to the provisions of Section 305 of the National Aeronautics and Space Act of 1958 (72 Stat. 435; 42 U.S.C. 2457).

This is a continuation of application Ser. No. 06/928,611, filed Nov. 4, 1986 and which is a continuation of application Ser. No. 06/651,391, filed Sept. 14, 1984, abandoned.

BACKGROUND OF THE INVENTION

1. Field of the Invention

The invention relates to long stroke magnetic springs, and in particular to such springs where linearity of the force-movement function is desirable. Such springs will find use in many applications where very long life is required, and where the mechanical wear and debris-generating characteristics of typical holders for helical coil springs create a problem. The invention is of particular advantage for those machines which require not only a relatively stiff spring which is linear over the range of movement of the sprung part, but in which a motor driving force is also desired to oscillate the part over the range of spring stroke.

A particular application for spring/motor combinations is the Stirling cycle refrigerating machine, which is especially useful for cooling to very low temperatures, for example in the range of 20° to 70° Kelvin, or even lower. Such machines, when installed in satellites to cool infrared sensors, must be capable of operating for thousands or tens of thousands of hours without maintenance or significant loss of refrigerating capacity. The zero-wear property of magnetic springs suggests their use for this application, but the non-linearity of known spring configurations has made them unsuitable.

2. Description of the Prior Art

The magnetic bearing structures described in the literature have been thought of primarily as magnetic supports or bearings, in which an article is suspended by magnetic forces, and has only very slight movement or preferably no movement against the magnetic suspending forces. The development of these techniques is described in *Magnetic and Electric Suspensions* by Geary, British Scientific Instrument Research Association, 1964.

In these applications, a primary concern has been the instability forces, which tend to cause the article to be displaced in a sideways or orthogonal direction to that of the suspension direction, whenever the article is the slightest bit off center in that orthogonal direction. These forces are described in the article "Permanent Magnet Bearings and Couplings" by Jean-Paul Yonnet, IEEE Transactions on Magnetics, Volume Mag-17, No. 1, Jan. 1981, pages 1169-1173. FIGS. 2-4 of this article show all of the basic configurations used for radial and axial magnetic bearings. In general, these configurations are selected to provide the maximum bearing force, and upon analysis it will be seen that all show a relatively high nonlinearity of the relationship between spring force and movement from the center or neutral suspension location.

Another analysis of magnetic springs, again being used as bearings, is given in Paper No. V-2 "Directivity and Stability of Coaxial Permanent Magnet Systems" by Gast, Mirihmadi and Wagner at the Fifth International Workshop on Rare Earth-Cobalt Permanent Magnets and Their Applications in June, 1981 (published by University of Dayton, K1-365, Dayton, Ohio 45469. As in the article described above, the concern is primarily with the relationship between the desired spring force, and the orthogonal instability forces. Thus the article focuses on the determination of the magnitude of the unstable forces and means for compensating for these. Although a number of different configurations are discussed, none provide any suggestion as to an arrangement which will provide a relatively long stroke, linear spring force.

SUMMARY OF THE INVENTION

An object of the invention is to provide a magnetic spring arrangement permitting a relatively long movement of the sprung article, with a linear force-movement function.

Another object of the invention is to provide magnetic springs which are linear over movement along selected coordinates of various coordinate systems.

A further object of the invention is to provide a magnetic spring/motor combination, in which one magnet system provides not only a long stroke spring centering force, but also serves as the field magnet of a driving motor for oscillating the sprung article over that range of movement.

In accordance with the invention, a magnetic spring arrangement includes two magnet pairs, the two magnets of each pair being poled in opposite directions along a direction orthogonal to the desired spring force direction, one of the magnets of each of the pairs being fixed with respect to each other, thus forming one set; the other magnets of each of the pairs being fixed with respect to each other, thus forming another set; and the sets being arranged so that in the neutral position, in which there is no net force in the spring force direction the magnets of each pair are offset in opposite directions with respect to each other in the desired spring force direction, so that the pairs provide equal and opposing repelling spring forces.

It will be clear that, as used herein and in the claims, "poled in opposite directions" means that flux produced by one magnet flows in a direction opposite to that of flux produced by the other magnet. Thus, if the magnets of a pair are aligned in line with each other in the directions of magnetization, poles with the same magnetic polarity will be facing each other.

According to a preferred embodiment of the invention for providing a linear axial spring force in a machine which is basically cylindrical in construction, first and second oppositely radially poled magnets are arranged symmetrically about the axis, and third and fourth radially opposite poled magnets are arranged concentrically about the same axis but spaced from the first set, the first and second magnets being axially offset from each other in one direction and the fourth and third magnets being axially offset in the opposite direction so that the axial repulsion force of the first and second magnets is equal and opposite to that produced by the third and fourth magnets.

Still more preferably, in an arrangement as described above, the first and third magnets are radially poled ring magnets, having inner cylindrical surfaces having the same diameter; the second and fourth magnets are ring magnets respectively poled radially opposite to the first and third magnets, having outer cylindrical surfaces having identical diameters, slightly less than the inside diameter of the first and third magnets; the first and third magnets are fixed with respect to each other at a first distance apart, and the second and fourth magnets are fixed with respect to each other at a smaller distance apart, such that the axially remote edges of the second and fourth magnet outer surfaces are approximately aligned with the axially facing edges of the inner faces of the first and third magnets.

According to another preferred aspect of the invention, a motor/spring combination is provided having an electric coil or conductor or set, fixed with respect to one of the magnet sets described in any of the preceding paragraphs, arranged so that electric current flows through the conductors of a conductor set in a direction orthogonal to the direction the magnets are poled and orthogonal to the direction of spring force, the conductors being at least partially in the field produced by one or both of the magnets of the other set.

Preferably, in a cylindrical machine construction, a coil concentric with the machine axis is fixed with respect to the outer set of magnets, and cooperates magnetically with the inner set whose magnets advantageously have longer faces that the outer set.

According to a still further preferred embodiment of a spring/motor combination, the second and fourth magnets have faces elongated toward each other in the axial direction, and two coil sets are provided arranged for opposite direction of current flow, one coil set being generally opposite each of the second and fourth elongated magnet faces.

The magnets of the above-described arrangements can also be aligned according to any of the other useful orthogonal coordinate systems. The two magnets of one set can be identically poled, in which case it may be possible to provide one magnet, relatively long in the direction of spring force, which provides the function of what has been described as two magnets. Because of other considerations, such as convenience in coil or flux return path construction, it may be preferred to have the magnets of a set poled opposite to each other.

Various preferred embodiments will be described below with respect to the drawing.

DESCRIPTION OF THE PREFERRED EMBODIMENTS

Figure 1:
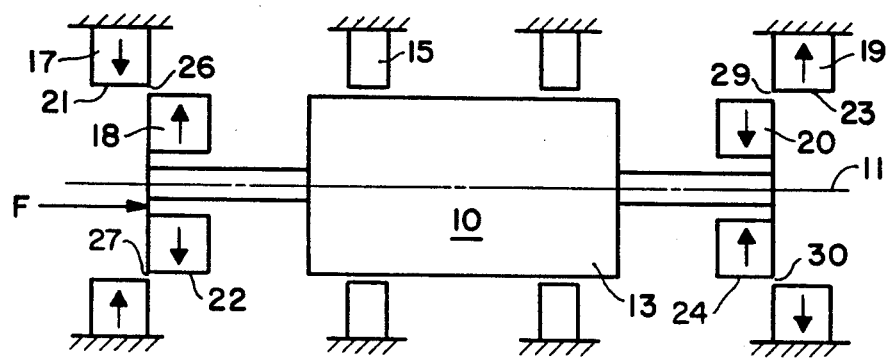
FIG. 1 is a mechanical schemmatic diagram of a cylindrical machine having a magnetic spring according to the invention.

A magnetically suspended and sprung shaft assembly 10 is illustrative of the principle of the invention. The shaft assembly 10 is symmetrical about an axis 11, and is formed principally by a central body 13, which is radially positioned by magnetic suspension elements 15 which may be of any well known "active" type; that is, they include a position sensing circuit, to determine when the central body is not exactly in the center of the machine, and a control system for providing magnetic force changes so as to restore the central body to the centered position. The central body 13 is positioned axially by a linear magnetic spring formed by the ring magnets 17, 18, 19, and 20. The magnets 17 and 19 are fixed with respect to the magnetic suspension elements 15 and with respect to each other, and form a first outer set of oppositely-poled ring magnets. The magnets 18, 20 are radially-poled ringed magnets forming a second, inner set. In a practical machine, the magnets 18 and 20 will have an outside diameter the same as that of the central body 13, having a value slightly smaller than the inside diameter of the magnetic suspension elements 15 and the first set of magnets 17, 19. The magnet 17 has a cylindrical inner face 21, and the magnet 18 has an outer cylindrical face 22, which are offset from each other in a neutral position of the shaft assembly 10, such that the near edge 26 of the face 21, at the side toward the magnet 19, is aligned at the same axial location as the far edge 27 of the magnet 18; similarly, the near edge 29 of the inner face 23 of the magnet 19 is at an axial location approximately in line with the far edge 30 of the outer face 24 of the magnet 20.

As is shown clearly in FIG. 1, the magnets 17 and 19 are substantially identical, their cylindrical inner surfaces having the same length; and the inner magnets 18 and 20 are substantially identical and have the same length cylindrical outer surfaces. The magnets 17 and 19 are spaced apart from each other a greater distance than that between the magnets 18 and 20. In the preferred embodiment shown, the distance between the magnets 17 and 19 is approximately equal to the sum of the distance between the magnets 18 and 20 and the lengths of their faces 22 and 24.

Magnets 17 and 19 should have equal magnetization, and magnets 18 and 20 should have equal magnetizations. Preferably, the magnetizations of magnets 17 and 18, which form a pair, are equal, as are the magnetizations of the magnets 19 and 20.

With this construction, upon application of a disturbing force F in an axial direction, the shaft assembly 10 will be displaced axially and the magnetic spring formed by the magnets 17, 18, 19, 20 will display a very linear increase of spring force, as a function of movement from the neutral position, for each direction of movement over a distance approximately equal to half of the length of the magnets; if either the inner or outer set of magnets are shorter, the linear half-stroke will be approximately half the length of the shorter magnet.

Figure 2:
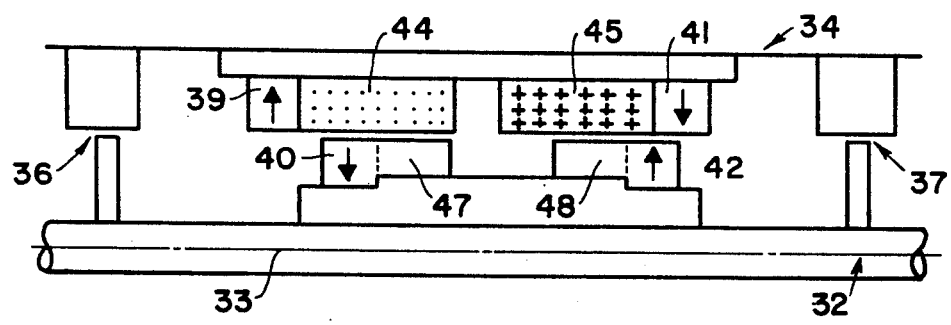
FIG. 2 is a diagrammatic view of a cylindrical machine with a spring/motor combination according to the invention.

FIG. 2 shows diagrammatically a spring/motor combination which is suitable for driving a machine that requires a precisely controlled stroke, and which may advantageously have an axial spring which is selected to have a value such that the mass of the oscillating shaft assembly and the spring are resonant at the frequency of shaft oscillation. One example of such devices are Stirling refrigerating machines. As shown in FIG. 2, a shaft assembly 32, which is symmetrical about an axis 33, is positioned within a frame assembly 34. Active magnetic bearing sets 36 and 37 are provided to center the shaft assembly 32 within the frame 34. For axial control of the shaft assembly, four samarium cobalt ring magnets are provided which function as a magnetic spring. Magnets 39 and 40 form a first pair of oppositely poled radial magnets which tend to displace the shaft assembly 32 toward the right as shown in the drawing; while magnets 41 and 42 form a second pair which tend to displace the shaft assembly toward the left. In this embodiments magnets 39 and 41 form a first set which are oppositely poled outer ring magnets.

Coils 44, 45 are helical coils concentric about the axis 33, energized in opposite directions by electronic circuitry not shown to provide a high driving force, the shaft magnets forming the second set are elongated, and have portions 47, 48 also formed of samarium cobalt magnetized respectively the same as the portions 40 and 42, so that the magnet portions 40 and 47 function as a field magnet with respect to the coil 44, and the magnet portions 42 and 48 function as a field magnet with respect to the coil 45.

Figure 3:
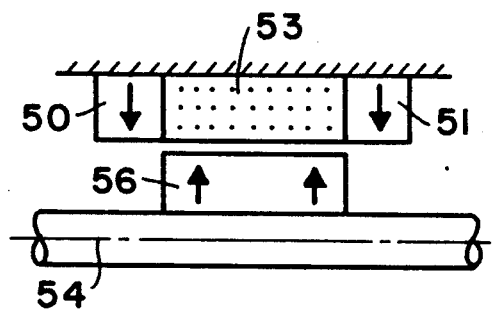
FIG. 3 is a diagrammatic view of a first alternative spring/motor embodiment having a single coil.

FIG. 3 illustrates schematically a linear spring/motor combination which functions in generally the same way as the embodiment of FIG. 2, but utilizes a smaller number of different kinds of hard magnetic elements. In this embodiment a first set of magnets 50, 51 are identical samarium cobalt radially-poled outer ring magnets poled in the same direction, i.e. having the same polarities, spaced apart by a single coil 53 which is wound helically about the axis 54. The second set of magnets are formed as a single, elongated ring magnet 56, poled oppositely to the magnets 50, 51, and having a length approximately equal to the length of the coil 53.

Figure 4:
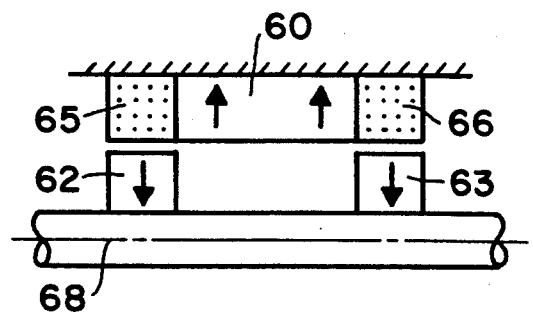
FIG. 4 is a diagrammatic view of a second alternative spring/motor embodiment having a single outer magnet between coil halves.

The spring/motor embodiment of FIG. 4 is analogous to that of FIG. 3, but utilizes a single elongated outer magnet 60, which functions as the first set of magnets, and cooperates with a second set of magnets 62, 63 which are identical to each other. Coils 65, 66 having the same inside diameter as the elongated magnet are provided concentrically about the axis 68, arranged as axial extensions of the magnet 60, to cooperate with the magnets 62, 63 respectively to provide driving force.

Figure 5:
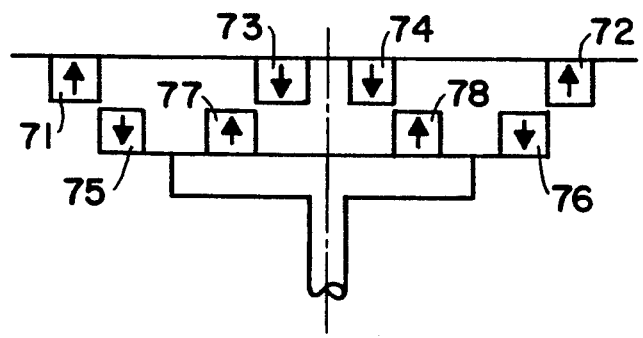
FIG. 5 is a diagrammatic view of a first radial spring embodiment according to the invention.

FIG. 5 diagrammatically shows a linear radial spring formed according to the instant invention. In this arrangement, magnets 71, 72 may be portions of a ring magnet, or may be individual pieces of hard magnetic material; with magnet portions 73, 74 they form a first set of magnets. Cooperating respectively with the magnet portions 71-74, a second set is formed by magnets 75, 76, 77 and 78. This embodiment displays a high axial reaction force.

Figure 6:
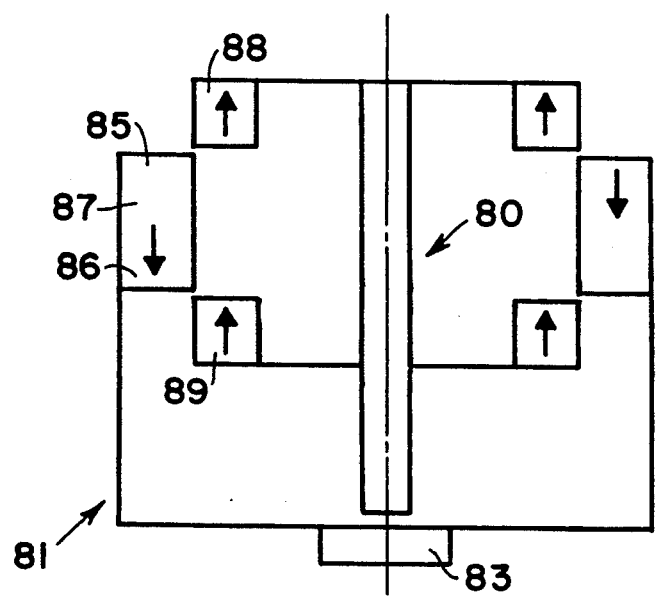
FIG. 6 is a diagrammatic view of a second radial spring embodiment.

The embodiment of FIG. 6 provides a radial spring utilizing three ring magnets, and shows axial instability but no axial force in the neutral position. A shaft assembly 80 is positioned axially with respect to a frame 81 by an axial suspension 83 which is shown single-ended, but in a practical embodiment may have operable portions at opposite ends of the machine. A first set of magnets are formed by portions 85, 86 of an axially magnetized ring 87 made preferable of samarium cobalt. A second set of magnets is formed by two identical ring magnets 88, 89 rigidly fastened to the shaft assembly 80. The outer magnet 87 and the shaft assembly magnets 88, 89 have facing planar faces, slightly spaced axially from each other at the two ends of the magnet 87.

The above-described embodiments may be constructed using hard magnet materials of may different types. In order to have maximum linearity and stiffness, the gap, observed in the direction of magnetization, between magnets of the first set and those of the second set should be a minimum consistent with manufacturing tolerances and the stiffness of the means utilized for controlling instability in the direction of the magnetization. Preferably, the magnets use cylindrical surfaces with generally squared edges.

For maximum stiffness, the opposed magnets of each pair should have approximately equal magnetization. However, this relationship is not so critical as the equality of the two magnets forming each set. For good linearity it will be recognized by those of ordinary skill that the inherent nonlinearities of the magnets forming each pair should be balanced out, by making the structure symmetrical.

The magnets themselves may be made of any hard magnetic material, but desirably should be one having a linear second quadrant demagnetization curve with a high coercivity and a high energy product. Samarium cobalt is a preferred material having these characteristics. Other materials which may be used where cost is a major factor include neodymium-iron-boron, which has a higher energy product; or other bonded hard magnetic materials such as ferrites or a bonded samarium cobalt. The materials will, or course, be selected for reduction of eddy currents as well as ease of manufacture.

Those of ordinary skill will recognize the symmetrical advantages of the cylindrical constructions shown. It will also be clear, however, that the same linearity and symmetries are readily obtained in a rectangular coordinate structure. Where other machine properties make it desirable, any orthogonal coordinate system may be the basis for making a magnetic spring or spring/motor combination as described in the claims. For example, in a cylindrical coordinate system a torsional spring or springs/motor may readily be designed in accordance with the invention. The magnet faces would be perpendicular to the axis, and the magnets would be poled axially. To reduce shaft bending, each "magnet" would comprise portions on opposite sides of the axis.

In view of the many variations discussed the scope of the invention is thus limited only by the following claims.

What is claimed:

1. A magnetic spring arrangement providing a linear spring force along at least one of three orthogonal coordinates defined with respect to an axis, comprising a first magnet poled in a first poling direction along a first coordinate direction orthogonal to said axis, having a first magnet face with a first magnetic polarity substantially parallel to said axis and facing in a first given direction parallel to said first coordinate direction, a second magnet poled in a second poling direction opposite said first poling direction along said first coordinate direction, having a second magnet face with said first magnetic polarity adjacent and substantially parallel to said face of said first magnet, facing in a direction opposite said first given direction, a third magnet poled in a third poling direction along said first coordinate direction, having a third magnet face with a second magnetic polarity substantially parallel to said axis, facing in a second given direction, a fourth magnet poled in a fourth poling direction opposite said third poling direction along said first coordinate direction, having a fourth magnet face with said second magnetic polarity adjacent and substantially parallel to said face of said third magnet, facing in a direction opposite said second given direction, first means for fixing said first and third magnets with respect to each other, the first and third magnet faces being spaced a first distance from each other along said one coordinate, second means for fixing said second and fourth magnets with respect to each other, the second and fourth magnet faces being spaced a second distance along said one coordinate less than said first distance, and means for preventing movement of said first and second means with respect to each other in said first coordinate direction, in a neutral position in which no net spring force is exerted, said magnets being arranged such that the faces of said first and second magnets are spaced from each other in said first given direction, and offset from each other along said one coordinate so as to exert a first repelling force with respect to each other along a spring direction which is parallel to said one coordinate, and the faces of said third and fourth magnets are spaced from each other in said second given direction, and offset from each other along said one coordinate so as to exert a repelling force equal and opposite in direction to said first repelling force.

2. A magnetic spring arrangement providing a linear spring force along an axis parallel to one of three orthogonal coordinates, said axis defining an axial direction, comprising a first magnet poled in a first poling direction along a first coordinate direction orthogonal to said axis, having a first magnet face, with a first magnetic polarity, substantially parallel to said axis and facing in a first given direction parallel to said first coordinate direction, a second magnet poled in a second poling direction opposite said first poling direction along said first coordinate direction, having a second magnet face, with said first magnetic polarity, adjacent and substantially parallel to said face of said first magnet, facing in a direction opposite said first given direction, a third magnet poled in a third poling direction along said first coordinate direction, having a third magnet face, with a second magnetic polarity, substantially parallel to said axis, facing in a second given direction, a fourth magnet poled in a fourth poling direction opposite said third poling direction along said first coordinate direction, having a fourth magnet face, with said second magnetic polarity, adjacent and substantially parallel to said face of said third magnet, facing in a direction opposite said second given direction, first means for fixing said first and third magnets with respect to each other, the first and third magnet faces being spaced a first axial distance from each other, second means for fixing said second and fourth magnets with respect to each other, the second and fourth magnet faces being spaced a second axial distance less than said first distance, and means for preventing movement of said first and second means with respect to each other in said first coordinate direction, in a neutral position in which no net spring force is exerted, said magnets being arranged such that the faces of said first and second magnets are spaced from each other in said first given direction, and offset axially from each other so as to exert a first repelling force with respect to each other along an axial spring direction, and the faces of said third and fourth magnets are spaced from each other in said second given direction, and offset axially from each other so as to exert a repelling force equal and opposite in direction to said first repelling force.

3. An arrangement as claimed in claim 2, characterized in that said first and third magnet faces each have a given length in said axial direction, and said second and fourth magnet faces each have a length in said axial direction greater than said given length.

4. A motor and spring combination as claimed in claim 3, characterized in that a first electric conductor set is disposed between said first and third magnets, arranged to permit passage of an electric current through said conductor set in a direction orthogonal to said first coordinate direction and said axis.

5. A motor and spring combination as claimed in claim 2, characterized in that a first electric conductor set is disposed between said first and third magnets, arranged to permit passage of an electric current through said conductor set in a direction orthogonal to said first coordinate direction and said axis.

6. A magnetic spring arrangement providing a linear axial spring force comprising a first ring magnet poled radially in a first poling direction and concentric about an axis, having a first circular cylindrical magnet face, with a first magnetic polarity, concentric with said axis and facing in a first given direction, a second ring magnet poled radially in a second poling direction opposite said first poling direction and concentric about said axis, having a second circular cylindrical magnet face, with said first magnetic polarity, concentric with said axis and adjacent said face of said first magnet, facing in a direction opposite said first given direction, a third ring magnet poled radially in a third poling direction and concentric about said axis, having a third circular cylindrical magnet face, with a second magnetic polarity, concentric with said axis, facing in a second given direction, a fourth ring magnet poled radially in a fourth poling direction opposite said third poling direction, having a fourth circular cylindrical magnet face, with said second magnetic polarity, concentric with said axis and adjacent said face of said third magnet, facing in a direction opposite said second given direction, first means for fixing said first and third magnets with respect to each other, the first and third circular cylindrical magnet faces being spaced a first axial distance from each other, second means for fixing said second and fourth magnets with respect to each other, the second and fourth circular cylindrical magnets faces being spaced a second axial distance less than said first axial distance, and means for preventing radial movement of said first and second means with respect to each other, in a neutral position in which no net spring force is exerted, said magnets being arranged such that the faces of said first and second magnets are spaced from each other in said first given direction, and offset axially from each other so as to exert a first repelling force with respect to each other along an axial spring direction, and the faces of said third and fourth magnets are spaced from each other in said second given direction, and offset axially from each other so as to exert a repelling force equal and opposite in direction to said first repelling force.

7. An arrangement as claimed in claim 6, characterized in that said first and third circular cylindrical magnet faces each have a given length in said axial direction, and said second and fourth circular cylindrical magnet faces each have a length in said axial direction greater than said given length.

8. An arrangement as claimed in claim 7, characterized in that said first and third circular cylindrical magnet faces have respective axially facing circular edges, and said second and fourth circular cylindrical magnet faces have respective axially remote circular edges and second and fourth lengths respectively in the axial direction; and said first axial distance is approximately equal to the sum of said second axial distance and said second and fourth lengths, whereby in said neutral position said axially remote edges of said second and fourth circular cylindrical magnet faces are adjacent said axially facing edges of said first and third circular cylindrical magnet faces.

9. An arrangement as claimed in claim 8, characterized in that said first and third magnets are identical except that said third poling direction is opposite said first poling direction, and said second magnetic polarity is opposite said first magnetic polarity.

10. An arrangement as claimed in claim 6, characterized in that said first and third circular cylindrical magnet faces have respective axially facing circular edges, and said second and fourth circular cylindrical magnet faces have respective axially remote circular edges and second and fourth lengths respectively in the axial direction; and said first axial distance is approximately equal to the sum of said second axial distance and said second and fourth lengths, whereby in said neutral position said axially remote edges of said second and fourth faces are adjacent said axially facing edges of said first and third circular cylindrical magnet faces.

11. An arrangement as claimed in claim 10, characterized in that said first and third magnets are identical except that said third poling direction is opposite said first poling direction, and said second magnetic polarity is opposite said first magnetic polarity.

12. An arrangement as claimed in claim 6, characterized in that said first and third circular cylindrical magnet faces are inner surfaces; said second and fourth ring magnets are a portion of a single elongated magnet having a generally circular cylindrical outer surface and a given length in said axial spring direction; and said first axial distance is approximately equal to said given length.

13. An arrangement as claimed in claim 6, characterized in that said first and third circular cylindrical magnet faces are inner surfaces having respective axially remote circular edges, said first and third ring magnets are portions of an elongated magnet having a given length; and said second axial distance is approximately equal to said given length.

14. A linear motor and spring combination comprising a first ring magnet poled radially in a first poling direction and concentric about an axis, having a first circular cylindrical magnet face, with a first magnetic polarity, concentric with said axis and facing in a first given direction, a second ring magnet poled radially in a second poling direction opposite said first poling direction and concentric about said axis, having a second circular cylindrical magnet face, with said first magnetic polarity, concentric with said axis and adjacent said first circular cylindrical magnet face of said first ring magnet, facing in a direction opposite said first given direction, a third ring magnet poled radially in a third poling direction and concentric about said axis, having a third circular cylindrical magnet face, with a second magnetic polarity, concentric with said axis, facing in a second given direction, a fourth ring magnet poled radially in a fourth poling direction opposite said third poling direction, having a fourth circular cylindrical magnet face, with said second magnetic polarity, concentric with said axis and adjacent said face of said third magnet, facing in a direction opposite said given direction, at least one electric coil concentric about said axis, first means for fixing said coil and said first and third magnets with respect to each other, the first and third faces being spaced a first axial distance from each other, second means for fixing said second and fourth magnets with respect to each other, the second and fourth faces being spaced a second axial distance different from said first distance, and means for preventing radial movement of said first and second means with respect to each other, in a neutral position in which no net spring force is exerted, said magnets being arranged such that the faces of said first and second ring magnets are spaced from each other in said first given direction, and offset axially from each other so as to exert a first repelling force with respect to each other along an axial spring direction, and the faces of said third and fourth ring magnets are spaced from each other in said second given direction, and offset axially from each other so as to exert a repelling force equal and opposite in direction to said first repelling force.

15. A combination as claimed in claim 14, characterized in that said second and fourth ring magnets form a magnet set, at least a portion of the respective faces of each magnet of said set being disposed radially opposite said coil.

16. A combination as claimed in claim 14, characterized in that said first and third ring magnets are identical except that said third poling direction is opposite said first poling direction, and said second magnetic polarity is opposite said first magnetic polarity, the combination comprises two said electric coils disposed between said first and third ring magnets, one coil being adjacent said second ring magnet and the other coil being adjacent said fourth ring magnet, said coils being connected for carrying current in opposite directions, and said second and fourth ring magnets are disposed radially opposite respective ones of said coils.

17. A combination as claimed in claim 14, characterized in that said first and third ring magnets form a first set, and said first and second magnetic polarities are a same polarity, said first and second given directions are the same, said second and fourth ring magnets form a second set, and, the ring magnets of one of said sets are portions of a single elongated magnet.

18. A combination as claimed in claim 17, characterized in that said one of said sets is said second set, and said elongated magnet has a given length approximately equal to said first axial distance.

19. A combination as claimed in claim 14, characterized in that said first and second given directions are the same, said first and third ring magnets form part of a single elongated magnet having a given inside diameter and a given length between ends thereof, and said linear motor and spring combination comprises two of said at least one electric coil, having a same inside diameter as said elongated magnet, a respective one of said electric coils being disposed adjacent to each end of said elongated magnet.

* * * * *